Dec. 19, 1967        M. M. GARVIN        3,358,715

MIXING FAUCET WITH SEALED ACTUATOR CHAMBER

Original Filed Aug. 23, 1963

INVENTOR

MILTON M. GARVIN,

BY *Yungblut, Melville, Strasser and Foster*

ATTORNEYS

United States Patent Office 3,358,715
Patented Dec. 19, 1967

3,358,715
MIXING FAUCET WITH SEALED
ACTUATOR CHAMBER
Milton M. Garvin, c/o Garvin Corporation, 2619 Colerain
Ave., Cincinnati, Ohio 45214
Continuation of application Ser. No. 304,017, Aug. 23,
1963. This application Dec. 27, 1965, Ser. No. 516,525
3 Claims. (Cl. 137—636.4)

ABSTRACT OF THE DISCLOSURE

Mixing valve body having two fluid inlets and a control chamber disposed therebetween, the valves for each fluid inlet having a stem sealingly extending into the control chamber, and operative in response to a cam movable within the control chamber.

This application is a continuation of application Ser. No. 304,017, filed Aug. 23, 1963, now abandoned, in the name of Milton M. Garvin and entitled, Mixing Faucet.

This invention relates to mixing valves, and more particularly to an apparatus for controlling the mixture of tow or more fluids of different character by means of a single control lever. The invention has great and particular utility in the field of plumbing fixtures, wherein it may be used, for example, to control through a wide range the mixture of hot and cold water supply.

Mixing faucets of the general type under consideration involve two or more valves, each controlling the flow of a particular fluid. By varying the relative degree of the opening of the two valves, and by varying the absolute opening of the two valves, one is able to control both the relative proportions of the two fluids and hence the mixture, as well as the total flow through the system.

Mixing valves having these general characteristics are known, but all presently available arrangements are subjected to certain limitations or difficulties. Specifically, according to conventional practice as exemplified by U.S. Patent 2,301,439 in the name of Moen and U.S. Patent 2,939,484 in the name of Leuthesser the two valves discharge their respective fluid into a mixing chamber. Within this mixing chamber is disposed the cam or other control means for operating the valve. Accordingly, the control means is continually subject to relatively harsh conditions. That is, the control means is disposed in a "wet chamber" and subjected to the action of the fluids controlled including any harsh chemicals or other matter carried thereby.

It is therefore a primary object of this invention to provide a mixing faucet of the character described in which the control means is disposed in a "dry chamber" and isolated from the harmful effects of the fluid being mixed.

It is a further object of the invention to provide a mixing faucet which, because of its unique design, will be characterized by completely trouble free use and a longer life than has heretofore been possible.

Still another object of the invention is to provide a mixing faucet utilizing a new and improved structure which is characterized by long life and ease of manufacture.

It is also, of course, an object of the invention to provide a mixing device incorporating the above improvements, and which will achieve the general objectives of present devices, including means for selectively positioning at least two different valve means to change the degree of mixing without changing the total discharge volume; and, alternatively, to change the discharge volume without changing the degree of mixing.

Numerous other objects and advantages of this invention will be become apparent to the skilled worker in the art upon reading this specification, and examining the accompanying drawings in which.

Figure 1:
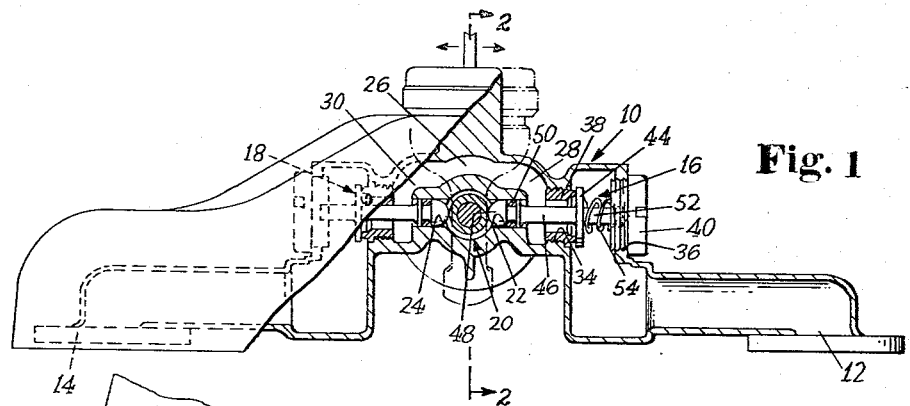
FIGURE 1 is a front elevational view of the mixing faucet of this invention, with parts broken away and parts in section.

Referring now to FIGURE 1, the general arrangement of parts of this invention will be briefly described. The mixing faucet includes a housing 10 provided with the fluid inlet 12 and 14 which will normally be a hot and cold water supply respectively. The flow of fluid through the inlets 12 and 14 is controlled by the coaxially aligned valves indicated generally at 16 and 18 respectively.

Disposed between the valves 16 and 18 is a control chamber indicated generally at 20 which is provided with the openings 22 and 24 arranged respectively to receive a stem portion of the valves 16 and 18 as will be described in more detail hereinafter. The control chamber houses the cam (described in more detail hereinafter) by means of which the valves 16 and 18 are actuated.

As indicated at the outset of this application, a most important object of this invention is to provide a "dry chamber" for the control means, in order to insure long life and trouble free operation for the unit. To this end, the housing 10 is provided with the mixing chamber 26 and the passages 28 and 30 communicating respectively with the valves 16 and 18. Suitable sealing means are provided between the valve stems and the openings 22 and 24 into the control chamber, so that fluid from the inlets 12 and 14 will pass through the valves 16 and 18, the passages 28 and 30, into the mixing chamber 26, and out the spout 32, without entering the control chamber 20.

In describing the construction in more detail, it should be pointed out that the two halves of the housing (as divided by the center line of FIGURE 1) are substantially identical, and hence only one half will be described: similarly, the valves indicated generally at 16 and 18 are identical, and only one will be described.

Figure 5:
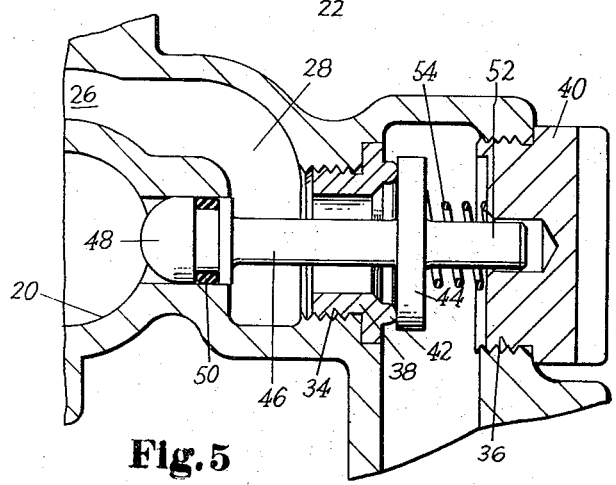
FIGURE 5 is an enlarged cross sectional view of one of the valve means.

Referring now to FIGURES 1 and 5, it will be seen that the housing 10 is provided with the openings 22, 34, and 36, which progressively increase in size. The opening 22 has already been described as the opening through which the stem portion of the valve extends into the control chamber.

The opening 34 threadedly receives the valve seat 38, while the opening 36 receives the valve cap screw 40. This particular construction greatly facilitates manufacturing economies, in that all three openings can be machined with a single three part tool.

The valve seat 38 is provided with the annular rim 42 against which the substantially planar valve 44 is adapted to seat.

Integral with the planar valve 44 is the central stem 46 which extends through the valve seat 38, and into the opening 22. The stem 46 is provided with the enlarged, generally spherical end portion 48 and a groove which receives the O ring 50, which as briefly indicated above, effects a seal between the stem and the opening 22.

The opposite surface of the planar valve 44 is provided with the stub projection 52, around which is placed the spring 54. The other end of the spring bears against the cap screw 40, and it tends to normally bias the planar valve 44 against the seat 38.

It should be pointed out at this time that the above described valve is an important facet of this invention. This valve is essentially self aligning. It will be noted that by virtue of this construction, it is possible to use a metal to metal seal, at a point where the prior art had always found it necessary to utilize a resilient material.

Figure 2:
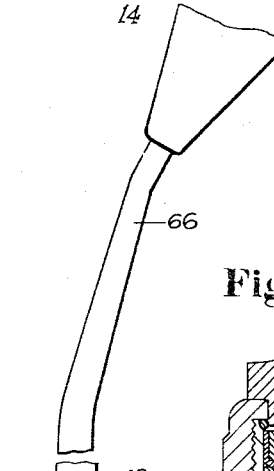
FIGURE 2 is a cross sectional view along the line 2—2 of FIGURE 1.
Figure 3:
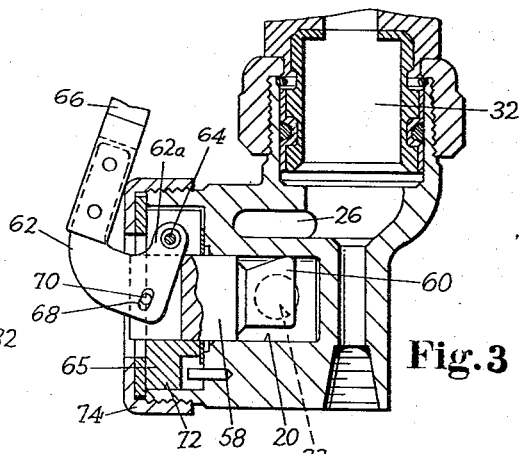
FIGURE 3 is a cross sectional view similar to FIGURE 2 showing the parts in a different position of operation.

Referring now to FIGURE 2, it will be seen that the rear portion of the control chamber 20 receives the cam shaft 58. The cam shaft is both slidable and rotatable as will be described later. The front end of the cam shaft 58 mounts the cam 60 which will be described in more detail hereinafter. The rearmost end of the cam shaft 58 is provided with a slot in which the pivot arm 62 is received. This pivot arm 62 is pivotally mounted as at 64 to the bearing 65 which will be described hereinafter, and is movable by means of the handle 66 from the position shown in FIGURE 2 to the position shown in FIGURE 3. It will be seen that the lowermost portion of the pivot arm 62 includes an elongate slot 68 through which passes the pin 70. This serves to connect the cam shaft 58 to the pivot arm 62 for axial movement therewith.

The bearing 65 is generally cylindrical in shape, and is provided with one radial slot which receives the portion 62a of the pivot arm 62. As briefly indicated earlier, the arm 62 is pivotally secured to the bearing 65 as at 64.

The cylindrical bearing 65 is received in a cylindrical recess 72 in the rear of the housing 10. It is held in place by means of the cap nut 74.

It will now be apparent that movement of the handle 66 to the left or right from the position shown in FIGURE 1 will effect a rotation of the bearing 65 within the recess 72. This will also cause the cam shaft 58 and cam to rotate about their longitudinal axis. Similarly, movement of the handle, from the position shown in FIGURE 2 to the position shown in FIGURE 3 will effect axial movement of the cam shaft 58 and cam 60 within the control chamber 20.

Figure 4:
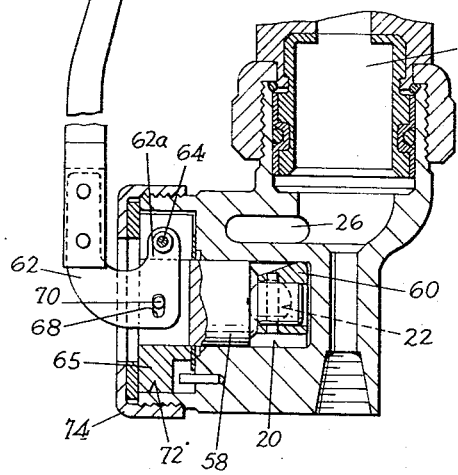
FIGURE 4 is a rear elevational view of the cam of the control mechanism.

Turning now to FIGURE 4, the cam 60 is shown in rear elevation. The cam can generally be described as being frusto-conical in form; its smaller base (the left hand end in FIGURE 2); is a circle concentric with the axis of the cam. The diameter of this circle is substantially equal to the distance between the spherical end portions 48 of the valve stems when the valves 16 and 18 respectively are seated. The larger base of the frusto-conical cam 60 is generally circular with its center offset with respect to the axis of the cam. The amount of this offset is indicated by dimension "A" in FIGURE 4, and it is substantially equal to the difference in radius between the smaller base and the larger base.

When the handle 66 is in the vertical position shown in FIGURE 1, and is in the rear position shown in FIGURE 2, the spherical end portions 48 of the valves 16 and 18 will be resting on the cam at points 76 and 76'. As the handle is moved directly forwardly to the position shown in FIGURE 2, the cam 60 will move rearwardly, and the spherical ends will be pushed outwardly, opening the valves. When the cam is moved all the way to the position shown in FIGURE 2, the spherical end portions will be resting on the points 78 and 78' respectively. Under these conditions, the valve will be opened the same amount, and a half and half mixture will be effected.

Assuming now that the cam shaft is rotated 45° to the left from the position shown in FIGURE 1. At this time, the spherical end portions of the valves 16 and 18 will rest on the points 80 and 80' respectively of the cam. As the cam is moved rearwardly to the position shown in FIGURE 3, the spherical end portions will be moved respectively to the points 82 and 82'. Under these conditions, it will be seen that one of the valves is opened substantially more than the other of the valves.

It is believed that operation of the cam arrangement will now be clear. To briefly summarize, rotation of the cam is effective to change the degree of mixing without changing the total discharge volume; and similarly, axial movement of the cam will change the discharge volume without changing the degree of mixing.

While the foregoing invention has been described in terms of a specific exemplary embodiment, it is to be understood and emphasized that no limitations are intended. Numerous modifications and changes can be made in the above structure without departing from the scope and spirit of the invention.

The embodiments of the invention in which an exclusive property or privilege is claimed are defined as follows:

1. A mixing faucet comprising:
   (a) a valve body having (i) two fluid inlets, (ii) means defining a valve seat adjacent each said inlet, and (iii) a control chamber intermediate said valve seats, said control chamber having an opening for and axially aligned with each said valve seat;
   (b) valve means for controlling the flow of fluid through each said inlet, said valve means comprising a substantially planar valve element adapted to seat against said valve seat, a valve stem extending from said valve element through said openings in said control chamber, and a projection coaxial with said stem extending from the opposite surface of said valve element;
   (c) sealing means cooperating between said valve stems and said openings in said control chamber;
   (d) guide means secured to said valve body and slidably receiving said projections;
   (e) means normally biasing said valve elements to the closed position;
   (f) a cam movable in said control chamber; and
   (g) means for moving said cam, whereby to move at least one of said valve stems and open at least one of said valve means.

2. The mixing faucet claimed in claim 1 wherein said valve means are coaxially aligned.

3. The mixing faucet claimed in claim 2 wherein said cam is generally frusto-conical and has a horizontal axis normal to the common axis of said valve means and intersecting said common axis at a point intermediate the ends of said valve stems, said cam being rotatable about said axis and slidable therealong, the smaller base of said frusto-conical cam being a circle concentric with the axis of said cam, the diameter of said circle being substantially equal to the distance between the end portions of said valve stems when said valve elements are seated against said seats, the larger base of said cam being generally circular in shape, the center of said larger base being offset with respect to the axis of said cam.

References Cited
UNITED STATES PATENTS

| | | | |
|---|---|---|---|
| 1,577,355 | 3/1926 | Palfy | 137—636.2 |
| 2,075,600 | 3/1937 | Baker | 137—636.1 |
| 2,580,553 | 1/1952 | King | 137—636.1 |
| 2,616,710 | 11/1952 | Woodruff | 137—607 X |
| 2,753,891 | 7/1956 | Parker | 137—607 X |
| 2,939,484 | 6/1960 | Leuthessen | 137—635 |
| 3,155,115 | 11/1964 | Zeigler | 137—607 X |
| 3,207,183 | 9/1965 | Stuhl | 137—636.1 |

CLARENCE R. GORDON, *Primary Examiner.*